United States Patent [19]

Woods

[11] 4,414,275

[45] Nov. 8, 1983

[54] UV CURABLE ADHESIVE TAPE

[75] Inventor: John Woods, Dublin, Ireland

[73] Assignee: Loctite (Ireland) Limited, Tallaght, Ireland

[21] Appl. No.: 282,782

[22] Filed: Jul. 13, 1981

[51] Int. Cl.$^3$ ............................ C09J 7/02; B32B 27/30
[52] U.S. Cl. .................................. 428/352; 428/353; 428/354; 428/355; 428/411; 428/483; 428/520; 428/522; 428/501; 428/524
[58] Field of Search ............... 428/501, 354, 352, 524, 428/525, 355, 353, 520, 522, 483, 411

[56] References Cited

U.S. PATENT DOCUMENTS

| | | | |
|---|---|---|---|
| 3,787,302 | 1/1974 | Ijichi | 525/104 |
| 3,847,725 | 11/1974 | Hochner | 428/354 |
| 3,996,308 | 12/1976 | Douek | 525/454 |
| 4,021,391 | 5/1977 | Ijichi | 525/123 |
| 4,091,157 | 5/1978 | Hori | 428/196 |
| 4,312,916 | 1/1982 | Kakumaru | 428/355 |
| 4,379,805 | 4/1983 | Downing | 428/352 |

*Primary Examiner*—Ellis P. Robinson
*Attorney, Agent, or Firm*—J. Rodney Reck

[57] ABSTRACT

A flexible adhesive tape comprising a thermoplastic support film etched on one side with a suitable etchant or etching method, said etched side being coated with a polyvinylformal pre-coat, and further coated with a photo-sensitive adhesive composition comprising, (i) at least one polymerizable acrylate ester monomer;
(ii) a photo-initiator;
(iii) optionally a film former;

and the other side of said thermoplastic support film being coated with a release agent.

These tape are useful as protective coatings, and adhere to a variety of surfaces, particularly high surface energy materials.

34 Claims, No Drawings

UV CURABLE ADHESIVE TAPE

BACKGROUND OF THE INVENTION

Adhesive tapes are known in the art for their convenience and ease of application. Typically, these tapes can be divided into several categories: solvent-activated adhesive tapes, heat-activated adhesive tapes, pressure-sensitive adhesive tapes, and photo-sensitive adhesive tapes. The solvent-activated adhesive tapes are rendered tacky by wetting with an organic solvent, such as water, prior to application of the tape. Once the solvent evaporates, a bond is formed between the adherends. Ordinarily, the adhesive compositions of the water-activated tapes are made from animal glue or dextrin and glycerine. These tapes tend to be very stiff and show a large tendency to curl. Additionally, tapes with adhesive compositions which are activated with organic solvents are currently not widely received due to health, fire, and environmental hazards, and the inconvenience of handling solvents.

Heat-activated adhesive tapes generally require heat and pressure for application. The adhesive compositions of these tapes can be formulated from a wide variety of thermoplastic materials such as waxes, cellulose esters, and ethers, polyethylene, polyvinyl chloride and rubber-resin combinations. Bonds formed from these adhesive tapes are nearly always irreversible and require special high-temperature presses.

Thus, a great deal of energy can be consumed when these tapes are used on an industrial level, and once a bond is properly formed, the bonded surfaces generally cannot be separated without destroying them.

Pressure-sensitive adhesives are generally defined as having a certain tack, which allows adherence upon application with slight finger pressure. The quality and bonds produced by these adhesive tapes are generally judged by T-peel strength, static shear, and polyken and loop tack and the adhesive compositions of these tapes are generally comprised of an elastomer component combined with a resin tackifier component which provides a balance of properties. Adhesive tapes of this kind often require the addition of a heat-curing, oil-soluble phenolic resin if they are to be used for high temperature or electrical applications. Additionally, a catalyst is normally added to promote the reaction between the phenolic resin and the elastomer. Such an adhesive tape would then be heat cured. Sulfur-curing systems tend to cause corrosion of copper and for this reason are not used in electrical applications. Similarly, sulfur-curing adhesive tapes cause undesirable stains on painted surfaces, requiring the use of antioxidants to deter this effect.

Control of the amount of cure is necessary for optimum performance, but is often difficult with pressure sensitive adhesive tapes. An insufficient cure or excessive cure can result in adhesive or cohesive failure at elevated temperatures and loss of pressure-sensitive tape properties. The pressure sensitive tapes of the prior art suffer from poor adhesion and may be easily peeled or removed from a substrate surface. Additionally, the adhesive composition of a cured or uncured pressure sensitive tape exhibits poor cohesion and results in a displacement of matter or creeping when weight is hung on the tape.

For a more detailed discussion of pressure-sensitive adhesive tapes and adhesive tapes in general, see U.S. Pat. Nos. 2,999,769, 3,239,478, U.S. Pat. No. Re. 24,906, U.S. Pat. Nos. 3,558,574, 3,535,293, 3,299,010, 3,519,585, 3,592,710, 3,676,202, 3,783,072, 3,784,587, 3,787,531, 3,932,328, 3,996,308, 4,092,376, 4,118,442, and 4,092,374.

It is evident that there is a need for an adhesive tape which has excellent bonding properties, and can resist extremes in environment for extended periods of time. The instant invention is designed to overcome the traditional problems of the prior art by providing an adhesive tape which can be bonded to a variety of surfaces, particularly high surface energy materials, in a short time at room temperature by irradiation.

SUMMARY OF THE INVENTION

This invention relates to an article of manufacture in the form of photo-sensitive polymerizable adhesive tapes or sheets and the process of making the same. Additionally, this invention concerns adhesive compositions which are employed in the adhesive tapes and a polyvinyl formal pre-coating which serves to promote adhesion between the adhesive compositions and the support film.

More particularly, this invention concerns a flexible tape comprising a thermoplastic support film etched on one side with a suitable etchant or etching method, said etched side being optionally coated with a polyvinylformal pre-coat, and further coated with a photo-sensitive adhesive composition comprising (i) at least one polymerizable acrylate ester monomer, (ii) a photo-initiator, (iii) optionally a film former, which must be present, however, in the event no pre-coating is used; and the other side of said thermoplastic support film being coated with a release agent. The instant tape is greatly improved over the prior art by its ability to adhere to high energy surfaces, particularly metals. The polyvinylformal pre-coat in combination with the etched surface of a thermoplastic support film gives excellent adhesion of the adhesive composition to its thermoplastic support film or bakcing. Thus, the tapes of this invention do not suffer from the problems typical of pressure-sensitive adhesive tapes, such as poor adhesion of adhesive composition to support film or substrate surface. The problems of solvent-activated and heat activated adhesive tapes are also avoided because the instant tapes generally require neither heat nor solvent evaporation for cure, but rather depend on a free-radical initiation of the adhesive composition for polymerization. The polymerizable compositions of these tapes cure rapidly at room temperature, preferably, via irradiation, to tough, heat age and solvent resistant materials. The instant tapes can be employed in a variety of applications as protective surface coatings, sealants, and various engineering uses. These tapes also provide a method for a nearly instant deposition of a hard, dry, scuff resistant coating or film on surfaces such as metals, ceramics, glass, wood and various plastics, particularly synthetics such as phenolics, polyvinylchloride, polycarbonate, polymethylmethacrylate, and especially to polyesters such as polyethyleneterephthalate. Particular uses include transparent or pigmented protective coatings for signatures or markings on documents or credit cards, preservation of fossils, microscopy, labeling, furniture protection, splinter-proofing of glass, repair patches for scratch marks on automobile bodies, the sealing of vacuum equipment or soldered points, and general protection from moisture, heat, and other environmental conditions, to name a few. A seal made with a tape of the invention can be broken by shearing or cutting or slitting, and remade by applying a fresh piece of tape over the cut piece.

DETAILED DESCRIPTION OF THE INVENTION AND ITS PREFERRED EMBODIMENTS

The thermoplastic support film, also commonly referred to as the carrier or backing for the adhesive composition of the adhesive tape, can be chosen from a wide variety of materials such as phenolics, polyvinylchloride, rubbers, polycarbonate, to name a few, but preferably are polyethyleneterephthate films. Typical of the polyethyleneterephthate films are those commonly known by the trade name Mylar, sold by E. I. DuPont de Nemours & Co. The polyethyleneterephthate film is a combination product of terephthalic acid or dimethylterephthate and ethylene glycol. Other films based on multi-functional carboxylic acids and their alkyl ethers and multi-functional alcohols are useful in the instant invention as well. These materials are ordinarily considered to be low surface energy surface materials, as compared to substances such as metals, woods, or ceramics, and are preferably in the form of a biaxially oriented tape or sheet. The carrier film may be dyed or pigmented with any number of colors, but it is preferred that the film be reasonably transparent to irradiation, for example, sun light, artificial UV radiation, etc., to permit cure of the photosensitive adhesive composition.

While the film's thickness will be selected in part based upon the desired flexibility, strength and intended use of the tape, it is generally preferable for the film to be about a half (0.5) to about five (5) mils thick. The lower limit is basically a question of choice and will be determined primarily based upon the strength of the film. As a general rule, the film thickness should not be less than about 0.1 mil.

The surface of the support film is treated prior to coating with the adhesive composition. The surface treatment can be performed by any number of well-known methods, such as chemical, electrical or mechanical processes, more particularly, flame treatment, grit blasting, corona discharge, roughing with an abrasive tool, or treatment with a corrosive chemical substance, such as acids, or by applying a key coating comprising isocyanate primers, polyfunctional enamines or organic titanates, for example. Of these, the preferred treatment is by an acid etch solution, the method of treatment normally entailing coating or dipping the chosen support film in the etchant. A most preferred embodiment is the etching, in this manner, of polyethyleneterephthalate film with a 1% solution of trichloracetic acid in methyl ether ketone. Another preferred chemical etchant is 5% aqueous trichloracetic acid.

To the etched surface of a support film, a pre-coating of polyvinylformal may be applied as a means of improving the adherence of the support film to the adhesive composition coated thereon. The exact mechanism or role the pre-coating plays is not fully understood at this time, but it apparently serves as a means of coupling the etched support film with the adhesive composition coated thereon. The pre-coating is optional, but highly recommended for optimum results.

The adhesive composition of these tapes is applied as a coating on the etched support film, and over the precoat, if any.

The adhesive composition is based upon one or more acrylate (including methacrylate) monomers known generally to the art for adhesive purposes. More particularly, the polymerizable acrylate ester monomers of these compositions may preferably be of the general formulas:

$$CH_2=C(R).COOR^1 \qquad \text{I}$$

where R may be H, $CH_3$, $C_2H_5$ or Cl, and $R^1$ may be $C_{1-8}$ mono-or bicycloalkyl, a 3 to 8-membered heterocyclic radical with a maximum of 2 oxygen atoms in the ring, H, alkyl, hydroxyalkyl or aminoalkyl where the alkyl portion is $C_{1-8}$ straight or branched carbon atom chain; or may be selected from the class consisting of polyfunctional acrylate and methacrylate esters of polyhydric alcohols, having the general formula:

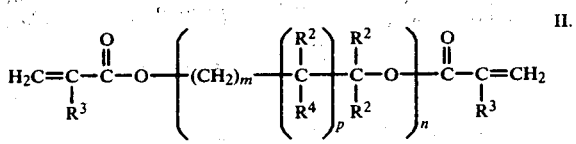

wherein $R^2$ is H, $C_{1-4}$ alkyl or hydroxyalkyl or

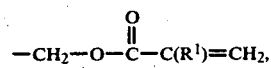

$R^3$ is H, halogen or $C_{1-4}$ alkyl, $R^4$ is H, OH or $-OO-C-C(R^1)=CH_2$, m is an integer from 1 to 8, n is an integer from 1 to 20 and p is 0 or 1, $R^1$ is as defined above; or may be selected from the class consisting of urethaneacrylates and substituted acrylate esters having the general formula:

$$(CH_2=CR^5.CO.O.R^6.O.CO.NH-)_2R^7 \qquad \text{III}$$

wherein $R^5$ is H, $CH_3$, $C_2H_5$ or Cl, $R^6$ is (i) a $C_{1-8}$ hydroxyalkylene or aminoalkylene group, (ii) a $C_{1-6}$ alkylamino-$C_{1-8}$ alkylene, a hydroxyphenylene, aminophenylene, hydroxynaphthylene, or aminonaphthylene optionally substituted by a $C_{1-3}$ alkyl, $C_{1-3}$ alkylamino or di-$C_{1-3}$ alkylamino group; and $R^7$ is $C_{2-20}$ alkylene, alkenylene or cycloalkylene, $C_{6-40}$ arylene, alkarylene, aralkarylene, alkloxyalkylene or aryloxyarylene optionally substituted by 1-4 chlorine atoms or by 1-3 amino or mono- or di-$C_{1-3}$ alkylamino or $C_{1-3}$ alkoxy groups; or said acrylates having the general formula:

$$(CH_2=CR^5.CO.O.R^6.O.CO.NH.R^7.NH.CO.X-)_nR^8 \qquad \text{IV}$$

wherein $R^5$, $R^6$, and $R^7$ have the meanings given above, $R^8$ is the non-functional residue of a polyamine or a polyhydric alcohol having at least n primary or secondary amino or hydroxy groups respectively, X is O or $NR^9$ where $R^9$ is H, or a $C_{1-7}$ alkyl group, and n is an integer from 2 to 20.

Among the monofunctional monomers represented by formula I above, the tetrahydrofurfuryl methacrylate, cyclohexyl methacrylate, isobornyl methacrylate, hydroxyethyl methacrylate, hydroxypropyl methacrylate, lauryl methacrylate, methyl methacrylate, 2-ethyl hexyl methacrylate, ethyl methacrylate, n-butylmethacrylate, iso-butyl methacrylate and t-butyl methacrylate. Of these, hydroxypropyl and 2-hydroxyethyl methacrylate are preferred. These monomers may be present in the amount of about 5% to about 80% by weight of the composition, preferably between about 20% to about 60%. A combination of these monomers may also be effectively employed and the preferred and recommended one is 2-hydroxypropylmethacrylate with methyl methacrylate in approximately equal amounts.

Polyfunctional monomers, as represented by formulas II, III, and IV, may be used in conjunction with, but generally not as a substitute for, the monofunctional monomers mentioned above. The amount of polyfunctional monomer may range from about 0% to about 50% by weight of the composition.

The two latter classes of urethane-acrylate monomers are especially excellent for providing optical clarity and toughness upon cure. Other polymerizable acrylate ester monomers useful in the instant invention are selected from the class consisting of the acrylate, methacrylate, and glycidyl methacrylate esters of bisphenol A. Nonpolar aliphatic and aromatic solvents and the like are often useful as a means of aiding deposition of the adhesive composition onto the thermoplastic carrier films.

The adhesive composition used in the invention must fulfill several requirements. Firstly, it must be of high viscosity as already stated, to enable it to remain in position on the carrier face of the tape without oozing from the sides of a roll of the prepared tape, and also to increase the effectiveness of the release treatment above referred to during unwinding. Similarly, it should not appreciably spread when the tape is pressed into engagement with a substrate surface.

In addition, the adhesive must be coated in a suitable thickness on the carrier for convenient use. Generally, it is present in a film between about 0.2 and about 5 mils thickness, preferably 0.5 to about 2 mils thickness.

The polymerization initiators used in the instant invention are present in the amounts of about 0.1 to about 10% by weight of the adhesive composition and are (a) organic compounds which are activated to produce free radicals by exposure to UV radiation, or (b) coreactants which react in situ to generate free radicals. Thus, free radicals are formed to initiate polymerization of the plymerizable acrylate monomers and harden the composition in adhesive contact with the substrate surfaces.

Initiators of type (a) above, are preferred, and comprise carbonyl containing compounds selected from: (i) $C_{1-6}$ straight or branched chain alkyl diones; (ii) non-carbonyl compounds that are known to photodecompose to free radicals in the presence of UV light. These include benzimidezoles various halogenated compounds, triphenyl derivatives of group V(a) elements in conjunction with a polyhalogen compound and aromatic complex salt photoinitiators selected from onium salts of group V(a), VI(a), and VII(a) elements and (iii) carbonyl compounds of the general formula:

   V in which $R^{10}$ is a $C_{1-10}$ alkyl, aryl, aralkyl or alkaryl radical, and $R^{11}$ is $R^{10}$ or H. R or $R^1$ can contain any substituents which do not adversely affect the compound in serving its intended function. For example, $R^{10}$ or $R^{11}$ can be alpha-substituted with an alkyl, aryl, alkaryl, alkoxy or aryloxy radical, or with an amino or a mono- or dialkylamino derivative thereof, all the above substituents containing up to about six carbon atoms. In addition $R^{10}$ and $R^{11}$, taken together with the carbonyl group to which they are attached, may represent an aromatic or heterocyclic ketone containing up to about 16 carbon atoms. These photoinitiators deemed useful in this invention are among those well-known to those skilled in the art.

The photo-polymerization initiator is preferably selected from the class consisting of acetophenones, benzophenones, and 1- and 2-acetonaphthones or a substituted compound of these. Among the most preferred photo-initiators are benzophenone, benzoin isobutylether, 1- and 2-naphthaldehyde, p-phenylacetophenone, n-propionophenone, fluoren-9-one, xanthen-9-one, 4,4-bis-methylaminobenzophenone, 2,2-dimethoxy-2-phenylacetophenone, 2,2-diethoxyacetophenone, 2-chlorothioxanthone, ethyl-p-dimethylaminobenzoate, or a combination of these.

Among the preferred non-carbonyl initiators are 2-chloromethyl-benzimidazole, 8-chlorosulfonyl-1-benzazine, 2-chloromethylanthracene, triphenylphosphine in conjunction with pentachlorobenzene, diaryliodonium hexafluorophosphate or diphenyl(diphenylsulfide)sulfonium hexafluoroantimonate.

The adhesive compositions employed in the instant invention may optionally contain other free-radical initiators such as peroxy, perester, or peracid polymerization initiators. Additionally, various accelerators of free-radical polymerization may be used to speed the cure of the adhesive composition. Among those accelerators well-known in the art are the amines and the sulfimides. Tertiary amines, such as N,N-dimethylparatoluidine, and sulfimides such as 3-oxo-2,3-dihydrobenz[d]isothiazole-1,1-dioxide, commonly known as saccharin, are particularly useful in the instant adhesive compositions of the adhesive tapes. Such accelerators are typically present in amounts of about 0.1 to about 10% by weight and preferably in the range of about 0.1 to 0.75%. As an alternative, these free-radical initiators may be added in micro-encapsulated form. Surface priming the substrates with accelerators or adhesion promoters may also be employed.

The speed of cure will vary depending upon the chosen photo-initiator and the relative intensity and wavelength of radiation used to cure the polymerizable composition of the tape.

Inhibitors and chelators, well recognized in the art for imparting stability to polymerizable compositions, are recommended. Those inhibitors useful in the present composition are usually selected from the group consisting of hydroquinones, benzoquinones, naphthoquinones, phenanthraquinones, anthraquinones, and substituted compounds of any of these. Among the chelators which may be optionally present in the adhesive composition are the beta-diketones and ethylenediaminetetra acetic acid (EDTA). Both the inhibitors and chelators may be effectively employed in levels of about 0.1 to about 1% by weight, without adversely affecting the speed of cure of the polymerizable adhesive composition.

As mentioned above, the present invention includes the process of making the tape products as well as the tape and compositions themselves. The tape products disclosed herein can be prepared by methods known in the art, most of such methods being similar to those used in the production of pressure-sensitive tapes, webs and labels. A typical example of a patent which discloses in greater detail methods for the preparation of spiral wound tapes is U.S. Pat. No. 3,343,978 to Engelbach.

In general, the adhesive tapes of this invention are made by taking a natural or synthetic thermoplastic polymer sheet or film and etching it with an etchant as previous described. A roll coating maching is then used to unwind the thermoplastic polymer under tension. The tape is passed over a roller which carries the adhesive composition and applies it to the tape. The excess adhesive is scraped off by a suitable means. As previously mentioned, the polyvinylformal pre-coating may also be applied after etching of the film and prior to deposition of the adhesive composition. In the event that this pre-coating is not applied, a film-forming agent, such as polyvinylformal, polyvinylchloride/-polyvinylacetate copolymer, or a chlorinated rubber, must be included in the adhesive composition. It is essential that either the film-forming agent or the pre-coating be present. However, it is recommended that both the precoating and the film-former be present in the instant adhesive tapes.

Any solvent in the adhesive coating is then allowed to evaporate and the tape is then coated on the other side with a release agent, such as a non-migratory silicone, which prevents the adhesive composition from adhering to both faces of the carrier film when the tape is wound into a spiral roll, or to adjoining tapes if layers or strips of tape are packaged or stored in a stacked fashion. Unlike many other film-carried adhesives, the adhesives of this invention need not have a second release coating on the first side of the tape to facilitate removal of the adhesive from the carrier film when the tape has been applied to the intended surface. On the contrary, it is the intention of this invention to provide a means of insuring adhesion between the thermoplastic carrier film and the adhesive composition.

The adhesive tape generally has a slight degree of tackiness in the uncured state, but does not possess the high degree of tack generally associated with pressure-sensitive adhesive tapes. However, the tack is usually enough to support weight of the film itself and allows for the tape to be applied with finger pressure to seal or coat in the uncured state. The tape can then be easily removed and reused, or photopolymerized via any of the known radiation techniques.

Thickeners, plasticizers, pigments, diluents, silane adhesive promoters, and other agents common to the art can be employed in any reasonable manner to produce the desired characteristics.

The invention will be further appreciated from the examples to follow, which are not intended in any way to restrict the effective scope of the invention.

EXAMPLE I

This example demonstrates the excellent retention of the Mylar TM film carrier to the adhesive coating, as well as the tape itself to various substrates.

A roll of 2 cm wide Mylar film, of 0.023 millimeters thickness, was etched on one side with a 1% solution of trichloracetic acid and allowed to dry. The etched surface was then coated with composition A (see Table 1) to a depth of 0.03 millimeters, and the unetched side was coated with a non-migratory silicone release agent. The tape was then wound into a roll. The same process was performed on Mylar film using composition B instead of composition A. Samples using Melinex TM film were similarly treated, several being coated with composition A and others with composition B.

Each of these samples of the completed tape was applied with hand pressure so that the adhesive-coated face was in contact with various substrates. Different woods, metals, ceramic articles (glazed and unglazed), papers (glazed and unglazed) and glass were chosen as substrates to which the tapes were applied.

All samples were exposed to moderate sunlight for about fifteen (15) minutes. In all cases the tapes had bonded to the substrate surface with unexpectedly high strength and could not be removed by hand. The Mylar and Melinex films remained strongly bonded to the adhesive coating.

TABLE 1

| Ingredient | Composition (parts by weight) | |
|---|---|---|
| | A | B |
| polyvinylformal | 28 | 33 |
| 2-hydroxypropylmethacrylate | 18 | 66 |
| acrylic acid | 32 | 0 |
| methyl methacrylate | 21 | 0 |
| dimethoxy-2-phenylacetophenone | 1 | 1 |

EXAMPLE 2

This example is designed to demonstrate the excellent retention of the polyester backing to the adhesive composition, as well as to distinguish the properties of the instant tapes from the pressure-sensitive tape art.

It is well recognized in the art that 180° peel tests measure one of the essential features of a pressure-sensitive tape. Table II shows the 180° peel strength properties (Kg-CM) of four adhesive tapes on various substrate. Sellotape 1607 is a commercially available pressure-sensitive tape comprising a thermosetting rubber based composition on a polyester support film (backing). This tape requires elevated temperature to cure, the recommended curing conditions being two hours at 150° C. Sellotape 1601 has a non-curing silicone based composition also with a polyester support film, and Sellotape 8001 has a polyimide support backing and a non-curing silicone adhesive.

Tape "C" is a tape of the instant invention comprising the following formulation:

| Ingredient | % by weight |
|---|---|
| polyvinylformal (Monsanto 7-95E) | 15.70 |
| methylene chloride | 47.10 |
| hydroypropymethacrylate | 29.90 |
| acid (i.e., acrylic acid) | 6.30 |
| silne | 0.5 |
| 2,2-diethoxyacetophenone | 0.5 |

Note that Tape "C" and Sellotape 1607 were allowed to cure to the substrate. The table indicates that 180° peel strength values were obtainable for commercial pressure-sensitive tape, as would be expected. Even when those tapes were tested for 180° peel properties without allowing for cure (Sellotape 1601, 8001), they demonstrated an ability to sustain peel.

It is clear from Table II, however, that once the instant tapes (Tape "C") are cured, peel values have little meaning, since the adherence of the tape and its backing to the substrate is strong enough to cause the polyester backing to tear prior to peel.

When Tape "C" is applied to a typical low energy, unetched polyester substrate, no sustained peel is possible. If the polyester substrate is etched, however, the tape adheres to the substrate so strongly as to cause tearing of the tape when peeling is attempted.

Thus, it is apparent from this example and the preceding one that the instant tapes do not exhibit identical properties to the pressure-sensitive tapes in the art, that is, the instant tapes do not exhibit 180° peel strength properties to any measurable extent. As evidenced by Table II, the instant tapes exhibit excellent adherence to substrates while retaining their polyester backing and structural integrity.

TABLE II
180° PEEL STRENGTH VALUES, Kg-CM WIDTH

| SUB-STRATE | STEEL | COPPER | ALUMINUM | POLYESTER | ETCHED POLYESTER |
|---|---|---|---|---|---|
| Tape "C" (cured) | polyester tears | polyester tears | Polyester tears | no sustained peel | polyester tears |
| Sellotape 1607 (cured) | 0.75 | 0.72 | 0.48 | 0.55 | — |
| Sellotape 1601 | 0.40 | 0.40 | — | 0.34 | — |
| Sellotape 8001 | 0.36 | 0.34 | — | 0.32 | — |

EXAMPLE 3

This example demonstrates a fundamental difference between the hot strength properties of the instant tapes of the prior art pressure-sensitive tapes. Table III shows the effect on adhesive lap shear joints of a sustained load of 500 grams at elevated temperatures.

The lap shear joints were comprised of two overlapping pieces of adhesive tape. Tape "D", as shown in Table III, is comprised of the following ingredients:

| Ingredient | % by weight |
|---|---|
| polyvinylformal (Rhone Poulenc, F5-35) | 16.40 |
| Hydroxypropylmethacrylate | 33.00 |
| 2,2'-Diethoxyacetophenone | 0.60 |
| methylene chloride | 50.00 |

Sellotape 1607 ® is a commercially available, rubber based, thermosetting pressure-sensitive tape, which has a recommended curing time of two hours at 150° C.

TABLE III

| | Adhesive lap joints under sustained load of 500 g at elevated temperature |
|---|---|
| Tape "D" (UV cured) | No deterioration of bond after 3 weeks at 150° C. - tape was still sustaining 500 g load |
| 1607 (heat cured) | bond failure after 20 minutes at 55° C. |
| 1607 (uncured) | bond failure after 3 minutes at 55° C. |

This table indicates that the instant UV tape bonds have excellent resistance to softening or creeping at elevated temperatures. This is a dramatic improvement over the pressure-sensitive tapes of the prior art.

We claim:

1. A flexible tape comprising a thermoplastic support film etched on one side with a suitable etchant or etching method, said etched side being coated with a polyvinylformal pre-coat, and further coated with a photo-sensitive adhesive composition comprising,
   (i) at least one polymerizable acrylate ester monomer;
   (ii) a photo-initiator,
   (iii) optionally a film former;
and the other side of said thermoplastic support film being coated with a release agent.

2. The article of claim 1, wherein the polymerizable acrylate ester monomer has the general formula:

$$CH_2=C(R).COOR^1 \qquad I$$

where R is H, $CH_3$, $C_2H_5$ or Cl, and $R^1$ is $C_{1-8}$ mono-or bicycloalkyl, a 3 to 8-membered heterocyclic radical with a maximum of 2 oxygen atoms in the ring, H, alkyl, hydroxyalkyl or aminoalkyl where the alkyl portion is $C_{1-8}$ straight or branched carbon atom chain.

3. The article of claim 1, wherein the polymerizable acrylate ester monomer is selected from the class consisting of polyfunctional acrylate and methacrylate esters of polyhydric alcohols, having the general formula:

$$H_2C=C-\underset{R^3}{\overset{O}{\overset{\|}{C}}}-O-\left[-(CH_2)_m-\left(\underset{R^4}{\overset{R^2}{\overset{|}{\underset{|}{C}}}}\right)_p-\underset{R^2}{\overset{R^2}{\overset{|}{\underset{|}{C}}}}-O-\right]_n-\underset{R^3}{\overset{O}{\overset{\|}{C}}}-C=CH_2 \qquad II.$$

wherein $R^2$ is H, $C_{1-4}$ alkyl or hydroxyalkyl or $$-CH_2-O-\overset{O}{\overset{\|}{C}}-C(R^1)=CH_2,$$

$R^3$ is H, halogen or $C_{1-4}$ alkyl, $R^4$ is H, OH or $-OO-C-C(R^1)=CH_2$, m is an integer from 1 to 8, n is an integer from 1 to 20 and p is 0 or 1, $R^1$ is $C_{1-8}$ mono-or bicycloalkyl, a 3 to 8-membered heterocyclic radical with a maximum of 2 oxygen atoms in the ring, H, alkyl, hydroxyalkyl or aminoalkyl where the alkyl portion is $C_{1-8}$ straight or branch carbon atom chain.

4. The article of claim 1, wherein the polymerizable acrylate ester monomer is selected from the class consisting of acrylate, methacrylate and glycidyl methacrylate esters of bisphenol A.

5. The article of claim 1, wherein the polymerizable acrylate ester monomer is selected from the class consisting of urethane acrylates and substituted acrylate esters having the general formula:

$$(CH_2=CR^5.CO.O.R^6.O.CO.NH-)_2R^7 \qquad III$$

wherein $R^5$ is H, $CH_3$, $C_2H_5$ or Cl, $R^6$ is (i) a $C_{1-8}$ hydroxyalkylene or aminoalkylene group, (ii) a $C_{1-6}$ alkylamino-$C_{1-8}$ alkylene, a hydroxyphenylene, aminophenylene, hydroxynaphthylene or aminonaphthylene optionally substituted by a $C_{1-3}$ alkyl, $C_{1-3}$ alkylamino or di-$C_{1-3}$ alkylamino group, and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1–4 chlorine atoms or by 1–3 amino or mono- or di-$C_{1-3}$ alkylamino or $C_{1-3}$ alkoxy groups; or said acrylates having the general formula:

$$(CH_2=CR^5.CO.O.R^6.O.CO.NH.R^7.NH.CO.X-)_nR^8 \qquad IV$$

wherein $R^5$, $R^6$, and $R^7$ have the meanings given above, $R^8$ is the non-functional residue of a polyamine or a polyhydric alcohol having at least n primary or secondary amino or hydroxy groups respectively, X is O or NR$^9$ where R$^9$ is H or a C$_{1-7}$ alkyl group, and n is an integer from 2 to 20.

6. The article of claim 2, wherein the polymerizable acrylate ester monomer is hydroxypropyl methacrylate or 2-hydroxyethyl methacrylate.

7. The article of claim 2, wherein the polymerizable acrylate ester monomer is selected from the class consisting of acrylic acid, methyl methacrylate, tetrahydrofurfuryl methacrylic, cyclohexyl methacrylate and 2-aminopropyl methacrylate.

8. The article of claim 6 or 7, wherein the polymerizable acrylate ester monomer is present in the amount of from about 5% to about 80% by weight of the composition.

9. The article of claim 3 or 5, wherein the polymerizable acrylate ester monomer is present in an amount which is less than about 50% by weight of the composition.

10. The article of claim 1, wherein the thermoplastic support film is a polyester compound in the form of a biaxially oriented sheet or tape.

11. The article of claim 10, wherein the polyester composition in the form of a biaxially oriented sheet or tape is polyethyleneterephthalate.

12. The article of claim 10, wherein the thermoplastic support film is polyvinylchloride.

13. The article of claim 11 or 12, wherein the surface-etching compound is an acidic solution.

14. The article of claim 12 or 13, wherein the acid solution comprises about 5% aqueous solution of trichloroacetic acid or about 0.1 to about 2% trichloroacetic acid in methyl ethyl ketone.

15. The article of claim 1, wherein the photo-initiator is selected from the class consisting of (a) C$_{1-6}$ straight or branched chain alkyl diones; (b) non-carbonyl compounds that are known to photodecompose to free radicals in the presence of UV light; and (c) carbonyl compounds of the general formula:

$$R^{10}(CO)R^{11} \qquad V$$

in which R$^{10}$ is a C$_{1-10}$ alkyl, aryl, aralkyl, alkoxy, aryloxy, or alkaryl radical, or an amine derivative thereof, and R$^{11}$ is R$^{10}$ or H.

16. The article of claim 15, wherein the photo-polymerizable initiator is selected from the class consisting of acetophenones, benzophenones and 1- and 2-acetonaphthones or a substituted compound of any of the foregoing.

17. The article of claim 16, wherein the photo-polymerizable initiators are benzophenone, benzoin isobutylether, 1-and 2-naphthaldehyde, p-phenylacetophenone, n-propionophenone, fluoren-9-one, xanthen9-one, 4,4-bis-dimethylaminobenzophenone, 2,2-dimethoxy-2-phenylaceto-phenone, 2,2-diethoxyacetophenone, 2-chlorothioxanthone, ethyl-p-dimethylaminobenzoate, or a combination of these.

18. The article of claim 15, wherein the photo-polymerizable initiator is 2-chloromethylbenzimidazole, 8-chlorosulfonyl-1-benzazine, 2-chloromethyl-anthracene, trihenylphosphine in conjunction with pentachlorobenzene, diaryliodonium-hexa-fluorophosphate or diphenyl (diphenylsulfide)sulfonium hexafluoroantimonate.

19. The article of claim 9, wherein the photo polymerization initiator is present in the amount of about 0.1% to about 10% by weight of the composition.

20. The article of claim 1, wherein the adhesive composition optionally contains a peroxy, perester, or peracid free-radical initiator, in the amount of about 0.1 to about 10% by weight of the composition.

21. The article of claim 1, wherein the adhesive composition contains an accelerator of free-radical polymerization.

22. The article of claim 21, wherein the accelerator of free radical polymerization is an amine or a sulfimide.

23. The article of claim 21, wherein the amine is N,N-dimethylparatoluidine and the sulfimide is 3-oxo-2,3-dihydrobenz[d] isothiazole-1,1-dioxide.

24. The article of claim 1, wherein the adhesive composition contains an inhibitor in the amount of about 0.1 to about 1% by weight of the composition, selected from the group consisting of hydroquinones, benzoquinones, naphthoquinones, phenanthraquinones, anthraquinones, and a substituted compound of any of the foreoing.

25. The article of claim 1, wherein the release agent is a non-migrating silicone.

26. The article of claim 1, wherein the adhesive composition optionally contains a chelator in the amount of about 0.1 to about 1% by weight of the composition.

27. The article of claim 26, wherein the chelator is ethylenediaminetetra acetic acid.

28. The article of claim 26, wherein the chelator is a beta-diketone.

29. The article of claim 1, wherein the film former is polyvinylformal.

30. The article of claim 1, wherein the film former is polyvinylchloride/polyvinylacetate copolymer or a chlorinated rubber.

31. The photoinitiator of claim 15, wherein, the non-carbonyl composition is halogenated.

32. The photoinitiator of claim 15, wherein, the non-carbonyl compound is a triphenyl derivative of group V(a) elements in conjunction with a polyolefin compound.

33. The photoinitiator of claim 15, wherein, the non-carbonyl compound is a benzimidazole.

34. The photoinitiator of claim 15, wherein, the non-carbonyl compound is selected from the group consisting of onium salts of the groups V(a), VI(a), and VII(a) elements.

* * * * *